United States Patent
Feller et al.

(10) Patent No.: US 8,931,801 B2
(45) Date of Patent: Jan. 13, 2015

(54) AIRBAG FOR A VEHICLE OCCUPANT RESTRAINT SYSTEM AND METHOD FOR PRODUCING A VEHICLE OCCUPANT RESTRAINT SYSTEM

(75) Inventors: Jens Feller, Illerkirchberg (DE); Torsten Schmidt, Berlin (DE); Rainer Heuschmid, Ulm (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/317,641

(22) Filed: Oct. 25, 2011

(65) Prior Publication Data

US 2012/0038136 A1 Feb. 16, 2012

Related U.S. Application Data

(63) Continuation of application No. PCT/EP2010/055709, filed on Apr. 28, 2010.

(30) Foreign Application Priority Data

Apr. 28, 2009 (DE) .......................... 10 2009 019 766

(51) Int. Cl.
*B60R 21/231* (2011.01)
*B60R 21/2334* (2011.01)
(Continued)

(52) U.S. Cl.
CPC ....... *B60R 21/2334* (2013.01); *B60R 21/23138* (2013.01); *B60R 2021/23576* (2013.01); *B60R 2021/23308* (2013.01)
USPC ..................................... 280/743.1; 280/730.2

(58) Field of Classification Search
CPC ............... B60R 21/23138; B60R 2021/23538; B60R 2021/23576

USPC ................... 280/729, 730.2, 731, 732, 743.1
See application file for complete search history.

(56) References Cited

U.S. PATENT DOCUMENTS 4,181,325 A 1/1980 Barnett
5,087,071 A 2/1992 Wallner et al.
(Continued)

FOREIGN PATENT DOCUMENTS

DE 41 25 530 A1 2/1992
DE 295 17 951 U1 3/1996
(Continued)

OTHER PUBLICATIONS

Sven Hofmann, Airbag for a vehicle occupant restraining system and process for its manufacture, Nov. 3, 2004, Germany, DE 102 46 768 A1, Machine Translation of Description.*
(Continued)

*Primary Examiner* — James English
(74) *Attorney, Agent, or Firm* — Foley & Lardner LLP

(57) ABSTRACT

An airbag for a vehicle occupant restraint system of a motor vehicle is provided. The airbag comprising at least one first and one second layer of an airbag material, at least one inflatable chamber formed between the first and the second layer, which is inflatable for the protection of a vehicle occupant and at least one seam, by which the first and the second layer are connected with each other along at least a portion of their respective circumference. The airbag is deployed between a vehicle occupant and a vehicle side structure. The airbag is formed such that when the airbag is mounted in the vehicle and inflated, the seam extends along a plane which is oriented obliquely or transversely to a plane formed by the longitudinal and the height direction of the vehicle.

21 Claims, 4 Drawing Sheets

(51) Int. Cl.
*B60R 21/235* (2006.01)
*B60R 21/233* (2006.01)

(56) References Cited

U.S. PATENT DOCUMENTS

| | | | |
|---|---|---|---|
| 5,464,250 A | | 11/1995 | Sato |
| 5,536,038 A | * | 7/1996 | Bollaert et al. ............ 280/730.2 |
| 5,566,972 A | * | 10/1996 | Yoshida et al. ............ 280/728.2 |
| 5,570,900 A | | 11/1996 | Brown |
| 5,586,782 A | * | 12/1996 | Zimmerman et al. ...... 280/730.2 |
| 5,806,881 A | | 9/1998 | Richter et al. |
| 6,231,069 B1 | * | 5/2001 | Yokoyama ................. 280/730.2 |
| 6,299,204 B1 | * | 10/2001 | Keshavaraj ................ 280/743.1 |
| 6,371,518 B1 | * | 4/2002 | Kalandek et al. .......... 280/743.1 |
| 6,478,329 B1 | * | 11/2002 | Yokoyama .................... 280/729 |
| 6,659,501 B2 | | 12/2003 | Rychter et al. |
| 7,168,733 B2 | | 1/2007 | Kumagai et al. |
| 7,347,444 B2 | * | 3/2008 | Wheelwright ................ 280/729 |
| 7,431,329 B2 | | 10/2008 | Taguchi et al. |
| 7,503,582 B2 | | 3/2009 | Sendelbach et al. |
| 7,938,438 B2 | * | 5/2011 | Denys et al. ............... 280/730.2 |
| 8,186,708 B2 | * | 5/2012 | Zhou et al. ................. 280/730.2 |
| 8,505,966 B2 | * | 8/2013 | Yoo ............................. 280/730.1 |
| 8,550,492 B2 | * | 10/2013 | Gwon ........................... 280/729 |
| 8,562,015 B2 | * | 10/2013 | Yamamoto .................... 280/729 |
| 8,616,579 B2 | * | 12/2013 | Suzuki et al. .............. 280/743.2 |
| 2001/0040364 A1 | * | 11/2001 | Viano et al. ................ 280/730.1 |
| 2002/0047253 A1 | | 4/2002 | Rasch et al. |
| 2002/0096869 A1 | | 7/2002 | Kai et al. |
| 2002/0180196 A1 | | 12/2002 | Rychter et al. |
| 2003/0094794 A1 | | 5/2003 | Amamori |
| 2005/0104342 A1 | * | 5/2005 | Jackson et al. ............. 280/730.2 |
| 2005/0189742 A1 | | 9/2005 | Kumagai et al. |
| 2005/0206138 A1 | * | 9/2005 | Breuninger et al. .......... 280/729 |
| 2005/0206140 A1 | * | 9/2005 | Bakhsh et al. .............. 280/730.2 |
| 2005/0206147 A1 | * | 9/2005 | Sievers ...................... 280/743.1 |
| 2006/0001244 A1 | | 1/2006 | Taguchi et al. |
| 2006/0131847 A1 | * | 6/2006 | Sato et al. .................. 280/730.2 |
| 2007/0126213 A1 | * | 6/2007 | Korechika ................. 280/730.2 |
| 2008/0174093 A1 | * | 7/2008 | Inoue ......................... 280/730.2 |
| 2008/0197611 A1 | | 8/2008 | Kabata |
| 2008/0252054 A1 | * | 10/2008 | Kim et al. .................. 280/743.2 |
| 2009/0051151 A1 | | 2/2009 | Choi |
| 2012/0025499 A1 | * | 2/2012 | Shibayama et al. ....... 280/730.2 |
| 2012/0056410 A1 | * | 3/2012 | Yamamoto ................. 280/730.2 |

FOREIGN PATENT DOCUMENTS

| | | | |
|---|---|---|---|
| DE | 195 29 829 C1 | | 10/1996 |
| DE | 197 51 898 A1 | | 6/1998 |
| DE | 100 18 170 A1 | | 10/2001 |
| DE | 102 46 769 A1 | | 4/2004 |
| DE | 10246768 A1 | * | 4/2004 |
| DE | 10 2004 011 369 A1 | | 10/2005 |
| DE | 10 2005 028 702 A1 | | 3/2006 |
| EP | 0 773 144 B1 | | 5/1997 |
| EP | 1 314 616 A1 | | 5/2003 |
| EP | 1 364 838 A2 | | 11/2003 |
| EP | 1 433 667 A2 | | 6/2004 |
| EP | 1 511 658 B1 | | 3/2005 |
| EP | 1 671 852 B1 | | 6/2006 |
| JP | 2002-220022 A | | 8/2002 |
| JP | 2008-308139 | | 12/2008 |

OTHER PUBLICATIONS

Sven Hofmann, Airbag for a vehicle occupant restraining system and process for its manufacture, Nov. 3, 2004, Germany, DE 102 46 768 A1, English Abstract.*
International Search Report for PCT/EP2010/055709; Sep. 23, 2010, 4 pages.
Notification of the Third Office Action dated Jan. 8, 2014 issued in connection with Chinese Application No. 201080018646.2.
Office Action dated Feb. 12, 2014 issued in connection with Japanese Application No. 2012-507730, with English translation.
Inflatable Vehicle Occupant Restraint, Research Disclosure, Mason Publications, No. 373, dated May 1, 1995, pp. 315-319.
Office action dated Jun. 23, 2014 issued in connection with European Patent Application No. 13190470.8
Assembly Drawing for Side Airbag dated Sep. 10, 1999.

* cited by examiner

AIRBAG FOR A VEHICLE OCCUPANT RESTRAINT SYSTEM AND METHOD FOR PRODUCING A VEHICLE OCCUPANT RESTRAINT SYSTEM

CROSS-REFERENCE TO A RELATED APPLICATION

This application is a continuation of International Patent Application Number PCT/EP2010/055709, filed on Apr. 28, 2010, which was published in German as WO 2010/125099. The foregoing international application is incorporated by reference herein.

BACKGROUND

This invention relates to an airbag for a vehicle occupant restraint system of a motor vehicle and a method for producing a vehicle occupant restraint system.

It is known to produce an airbag of a vehicle occupant restraint system from at least two layers of an airbag material, e.g. a textile fabric. The two layers are connected with each other by a seam extending along their respective circumference such that between the layers at least one inflatable chamber is obtained.

SUMMARY

The problem to be solved by the invention consists in creating an airbag which has a contour damping an impact as well as possible and which nevertheless is easy to produce.

According to an exemplary embodiment of the invention an airbag for a vehicle occupant restraint system is provided, comprising
  a first and a second layer of an airbag material;
  at least one chamber formed between the first and the second layer, which is inflatable for the protection of a vehicle occupant; and
  at least one seam, by which the first and the second layer are connected with each other along at least a portion of their respective circumference, wherein
  the airbag is deployed between a vehicle occupant and a vehicle side structure.

The airbag is formed such that when the airbag is mounted in the vehicle and inflated, the seam extends along a plane which is oriented obliquely or transversely to a plane formed by the longitudinal and the height direction of the vehicle.

Thus, the seam is a peripheral seam by which the two layers (in particular in the form of at least approximately congruent airbag blanks) are connected with each other such that the chamber inflatable for the protection of the vehicle occupant is defined by the layers, i.e. the chamber extends between the two layers. In particular, the seam can extend not only along portions, but along the entire respective circumference of the two airbag layers, i.e. the seam can be formed all around, so that it completely surrounds the inflatable chamber.

The seam of the airbag according to the invention extends obliquely or transversely to a peripheral seam of a conventional airbag mounted in the vehicle, which lies in a plane formed by the longitudinal and the height direction of the vehicle (e.g. in a side airbag mounted on or in a vehicle seat or in a curtain airbag). In particular, the plane along which the seam extends is rotated about an axis which extends parallel to the height direction of the vehicle relative to the plane which is formed by the longitudinal and the height direction of the vehicle, but not tilted about an axis which extends parallel to the longitudinal direction of the vehicle. In other words, in particular the height direction of the vehicle, but not the longitudinal direction of the vehicle, extends parallel to the plane along which the seam extends.

Due to this seam contour it is possible to predetermine the contour of the airbag already by means of the seam, in particular without additional contour-defining means such as catch straps having to be present. Since an airbag usually adopts its largest expansion in the inflated condition along the plane of the peripheral seam, the effective thickness of at least a portion of the airbag can be predetermined already by the location of the peripheral seam (i.e. the seam which connects the first and the second layer with each other).

Due to the orientation of the seam transversely to the plane which is formed by the longitudinal and the height direction of the vehicle, a great effective thickness of the airbag can be realized in transverse direction of the vehicle, e.g without additional means having to be provided, which limit the expansion of the airbag in longitudinal direction of the vehicle.

In accordance with another exemplary aspect of the invention the seam extends obliquely or transversely to a plane along which a steering-wheel rim of a steering wheel of the motor vehicle and/or a surface of the passenger dashboard of the vehicle extends, wherein the airbag is integrated e.g. into the steering wheel of the vehicle. Similar to the side airbag, the effective thickness of a driver or passenger airbag between the steering wheel or the passenger dashboard and the vehicle occupant to be protected can already be predetermined by the location of the peripheral seam.

In one exemplary aspect of the invention, the airbag not only includes a first seam which connects the first and the second layer with each other, but at least one further seam which likewise connects layers of the airbag with each other along a portion of their circumference. The two layers connected with each other by the second seam in particular also are the first and the second layer, so that the first and the second layer are connected with each other by the first seam along a first portion and by the second seam along a second portion of their respective circumference.

In another exemplary example, the second seam however connects two further layers, which are different from the first and the second layer and are arranged at a distance for example to the first and the second layer. It is, however, also possible that the further layers each are connected with the first and the second layer.

The first and the second layer in particular are arranged at an angle to each other (i.e. they extend along planes oriented obliquely or transversely to each other), in order to define the contour of the inflated airbag. The first and the second seam (or all seams of the airbag which connect airbag layers, if more than two of such seams are present) each can extend e.g. along a plane which is oriented obliquely or transversely to the plane formed by the longitudinal and the height direction of the vehicle.

However, it is of course also possible that the further seam (or at least one of the plurality of further seams) extends in a conventional direction, i.e. parallel to a plane which is formed by the longitudinal and the height direction of the vehicle.

For example, the first seam extends along a first plane which is oriented transversely to a plane formed by the longitudinal and the height direction of the vehicle (or transversely to a plane along which a steering-wheel rim of a steering wheel of the motor vehicle and/or a surface of the passenger dashboard of the vehicle extends), and the second seam extends along a second plane which extends parallel to a plane formed by the longitudinal and the height direction of the vehicle (or is oriented parallel to a plane along which a steering-wheel rim of a steering wheel of the motor vehicle and/or a surface of the passenger dashboard of the vehicle extends).

In another exemplary development of the invention, the first and the second layer define a first chamber and the two further layers define a second chamber of the airbag. It is, however, also conceivable that the first and the second layer together with the two further layers define a (individual) chamber of the airbag. In particular, it is also possible that, when the layers connected with each other by the second seam are no separate layers, but likewise are the first and the second layer, the first and the second layer are connected with each other by at least two seams (the first and the at least one second seam) oriented obliquely or transversely to each other, but nevertheless form an individual chamber.

Due to the seams extending obliquely or transversely to each other, a twisting of the airbag is obtained, so to speak, whereby an airbag contour is realized which in particular along the seam extending obliquely or transversely to the plane formed by the longitudinal and the height direction of the vehicle (or obliquely or transversely to a plane along which a steering-wheel rim of a steering wheel of the motor vehicle and/or a surface of the passenger dashboard of the vehicle extends) has a greater effective thickness as compared to the remaining airbag. It is of course also possible (in particular in the case of a driver airbag) that the airbag only includes one single inflatable chamber whose peripheral seam, as described, is oriented obliquely.

In another exemplary aspect of the invention, the first and the second layer are formed of an integral, folded piece of material (butterfly design), wherein the portions of the piece of material folded onto each other are connected with each other along their circumference (outside the folded edge) by means of the seam. It is, however, also conceivable that the first and the second layer are formed of initially separate material pieces which then are connected with each other by the seam. Of course, the airbag can also have more than two (e.g. adjoining) layers which are connected with each other by the seam.

In particular, it is also possible that the first and the second layer define a plurality of inflatable chambers without additional, separate airbag layers being provided, e.g. in that separating means (e.g. a catch strap) are arranged between the first and the second layer.

It should be noted that the seam by which the first and the second layer are connected with each other in particular is a sewn seam. It is, however, also possible that the seam is realized by a line-type adhesive connection.

Furthermore, the airbag according to the invention can include fastening means for connecting the airbag with a gas generator for inflating the airbag, which are arranged at a distance to the seam. In particular, the fastening means are formed by at least one opening in the first or the second layer, wherein the openings e.g. are designed such that fastening bolts for fixing the gas generator at the airbag can extend through the same.

In another exemplary development, the airbag includes an outflow opening arranged at a distance to the seam by which the first and the second layer are connected with each other, through which gas can flow out from the airbag into the environment. In particular, this outflow opening is arranged such that in the mounted airbag it points in forward driving direction.

The airbag according to the invention is formed e.g. in the form of a side airbag, which in particular is to be arranged in or at a vehicle seat or in or at a vehicle door, or in the form of a curtain airbag, which in particular is mounted along a roof rail of the vehicle and which in the inflated condition extends along a long side of the vehicle.

In a second exemplary aspect the invention relates to an airbag, comprising
a first and a second layer of an airbag material;
at least one chamber formed between the first and the second layer, which is inflatable for the protection of a vehicle occupant; and
at least one seam, by which the first and the second layer are connected with each other along at least a portion of their respective circumference, wherein
in the inflated condition the airbag extends along a main plane of extension.

In accordance with the invention, the seam extends along a plane which is oriented obliquely or transversely to the main plane of extension.

The seam (peripheral seam) by which the first and the second layer are connected with each other thus does not extend like the seam of a conventional airbag along a plane which is oriented vertically to the main direction of action of the airbag, but along a plane to which the main direction of action of the airbag is not vertical. The "main direction of action" of the airbag is the direction in which the airbag chiefly should absorb impact energy, wherein the main direction of action coincides with the direction in which the greatest action of force on the vehicle occupant is to be expected in a side or front impact.

"Main direction of extension" is understood to be that plane along which the inflated airbag has its greatest expansion. In particular, the main plane of extension in a multi-chamber airbag is determined by the plane of maximum expansion of that chamber which has the greatest volume. For example, the main plane of extension of a side airbag (seat airbag, door airbag or curtain airbag) at least approximately extends along a plane formed by the longitudinal and the height direction of the vehicle. The main plain of extension of a driver airbag for example extends approximately parallel to a steering-wheel rim of the steering wheel of the vehicle.

In accordance with an other exemplary aspect of the invention the airbag is deployed along a main direction of deployment, wherein the seam by which the first and the second layer are connected with each other along at least a portion of their respective circumference is not oriented vertically to the main direction of deployment. "Main direction of deployment" of the airbag is understood to be that direction in which the airbag experiences the greatest change in its expansion during deployment. For example, in a side airbag arranged at a vehicle seat its main direction of deployment can point approximately in forward driving direction or be oriented vertically to a backrest of the vehicle seat. In a driver airbag, the main direction of deployment is e.g. vertical to the plane of the steering-wheel rim.

The invention also relates to a method for producing a vehicle occupant restraint device, according to which an airbag is provided which includes a first and a second layer of an airbag material, which are connected with each other by a seam along their respective (outer) circumference. The airbag is arranged in the vehicle such that the seam extends along a plane which is oriented obliquely or transversely to a plane formed by the longitudinal and the height direction of the vehicle.

In particular, the invention also relates to a method for producing an airbag, according to which a first and a second layer of an airbag material are connected with each other by a seam along at least a portion of their respective circumference, wherein the first and the second layer are formed such that when arranging the airbag in a vehicle such that the airbag is deployed between a vehicle occupant and a vehicle side structure, the seam extends along a plane which is oriented obliquely or transversely to a plane formed by the longitudinal and the height direction of the vehicle.

Accordingly, the first and the second airbag layer are provided in the form of blanks which for producing the airbag are connected with each other along their respective outer circumference. The blanks are designed such (e.g. non-congruent or non-circular) that the airbag (e.g. in the form of a side airbag) is arranged in the vehicle like a conventional airbag (i.e. an airbag with conventional seam contour), but the seam which connects the two airbag layers with each other extends obliquely to the plane formed by the longitudinal and the height direction of the vehicle and/or to the main plane of extension of the airbag.

BRIEF DESCRIPTION OF THE DRAWINGS

The invention will subsequently be explained in detail by means of exemplary embodiments with reference to the Figures, in which.

DETAILED DESCRIPTION

Figure 1:
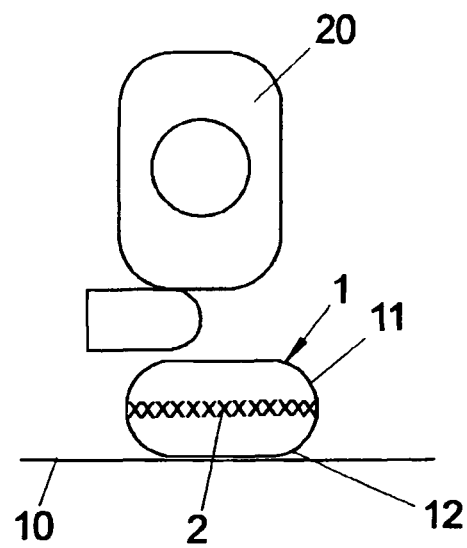
FIG. 1 shows a conventional airbag.

FIG. 1 relates to a conventional side airbag 1 which in the illustrated inflated condition extends between a vehicle side structure 10 and a vehicle occupant 20 to be protected. The vehicle occupant 20 is seated on a non-illustrated vehicle seat, wherein the airbag 1 is integrated in particular into the vehicle seat or into a vehicle door of the vehicle side structure.

The conventional airbag 1 includes a first airbag layer 11 and a second airbag layer 12, which are connected with each other by means of a peripheral seam 2, so that between the layers 11, 12 an inflatable chamber is formed. The airbag 1 is designed and mounted in the vehicle such that the peripheral seam 2 extends along a plane which is formed by the longitudinal direction and the height direction of the vehicle, i.e. which is oriented vertical to the direction of action and parallel to the main plane of extension of the airbag, respectively.

Due to this contour of the peripheral seam 2, the inflated airbag has its greatest expansion in direction of the longitudinal axis of the vehicle. To increase the effective thickness of the airbag between the vehicle occupant and the vehicle side structure, i.e. along the transverse direction of the vehicle, catch straps or darts (not shown) can be provided, which limit the expansion of the airbag in longitudinal direction of the vehicle and thereby effect a greater expansion of the inflated airbag in transverse direction of the vehicle.

Figure 2:
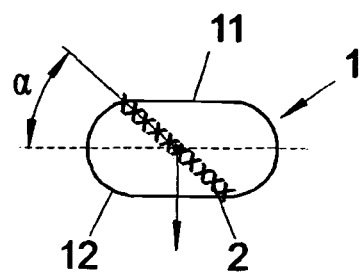
FIG. 2 shows an airbag according to a first exemplary embodiment of the invention.

FIG. 2 schematically shows an airbag 1 according to the invention, which like the airbag from FIG. 1 has two airbag layers 11, 12 which are connected with each other by means of a peripheral seam 2 which extends along a portion of the circumference of the respective layer.

With the airbag mounted in the vehicle, the seam 2, in contrast to FIG. 1, does not extend along a plane which is formed by the longitudinal and the height direction of the vehicle, but along a plane which is oriented obliquely to this plane under an angle $\alpha$. In the illustrated example, the plane along which the seam 2 extends is rotated, so to speak, with respect to the plane formed by the longitudinal and the height direction of the vehicle by the angle $\alpha$ about an axis parallel to the height direction of the vehicle.

The invention is of course not limited to a certain orientation of the seam obliquely to the conventional seam contour, but in principle any seam contours obliquely to the plane formed by the longitudinal and the height direction of the vehicle are conceivable. For example, the angle $\alpha$ can be 0° to 180°.

In addition, the plane along which the seam 2 extends can also be thought to be formed in that the plane along which the conventional seam extends, i.e. the plane formed by the longitudinal and the height direction of the vehicle, additionally or alternatively to the rotation about an axis in height direction of the vehicle can be rotated about an axis which extends parallel to the longitudinal direction of the vehicle, and/or about an axis which extends parallel to the transverse direction of the vehicle.

In addition, the point of rotation, about which the plane of the conventional seam is rotated, need not lie on an axis of symmetry of the airbag, but can also lie at its edge or also outside the airbag, so that the invention generally relates to airbags which have a connecting seam between the first and the second layer, which extends along a plane which somehow is oriented obliquely or transversely to a plane formed by the longitudinal and the height direction of the vehicle.

Figure 3:
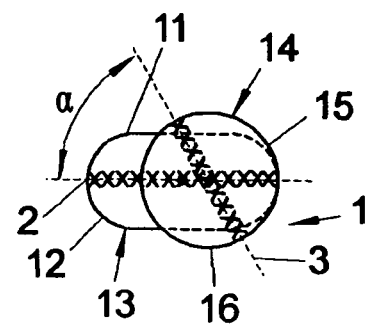
FIG. 3 shows an airbag according to a second exemplary embodiment of the invention.

FIG. 3 schematically shows that it is also possible to provide more than one peripheral seam which connects the layers of the airbag with each other, wherein the peripheral seams can be oriented differently. In the example of FIG. 3, the airbag 1 has a lower portion 13, which for example constitutes an inflatable chamber of the airbag, and an upper portion 14, which for example forms a further chamber of the airbag. The upper and the lower portion 13, 14 can, however, form a common chamber of the airbag.

The lower portion 13 is formed by the first and the second layer 11, 12, which are connected with each other along a first peripheral seam 2. Like in the conventional airbag, the peripheral seam 2 extends parallel to a plane which is formed by the longitudinal and the height direction of the vehicle.

The upper portion 14 of the airbag 1 is formed by two further layers 15, 16 which are connected with each other by a second peripheral seam 3. It is conceivable that the airbag layers 11 and 15 as well as 12 and 16 are formed integrally with each other, i.e. these layers each form a continuous layer.

The second peripheral seam 3 extends along a plane which is rotated by an angle $\alpha$ relative to the plane formed by the longitudinal and the height direction of the vehicle, and hence relative to the first peripheral seam 2, so that the upper portion 14 of the airbag is twisted, so to speak, relative to the lower airbag portion 13.

It should be noted that the principle of FIGS. 1 to 3 analogously can also be employed in other types of airbag, e.g. in a curtain, driver, passenger or knee airbag.

Figure 4A:
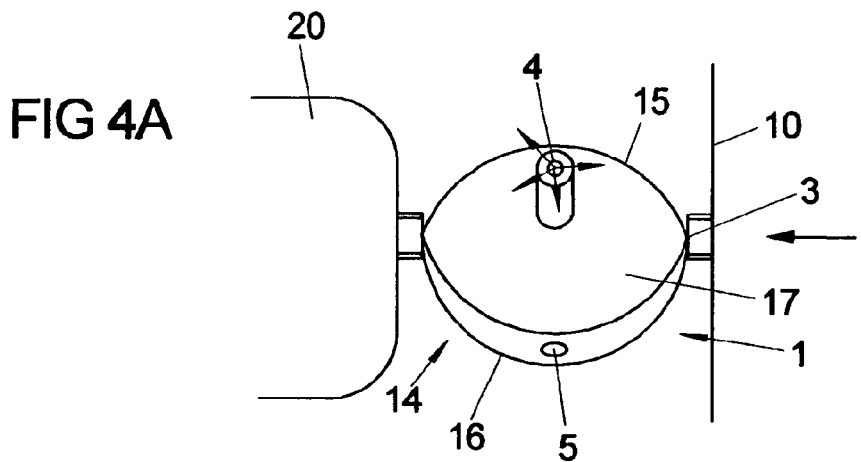
FIG. 4A shows an airbag according to a third exemplary embodiment of the invention.
Figure 4B:
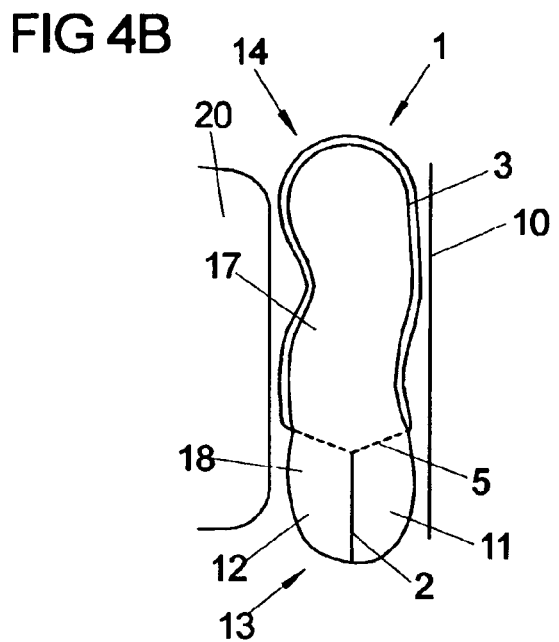
FIG. 4B shows a view of the airbag according to FIG. 4A from the front of the vehicle.
Figure 4C:
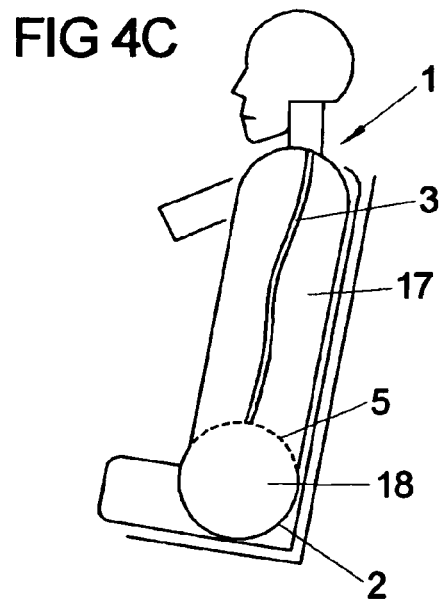
FIG. 4C shows a side view of the airbag according to FIG. 4A as seen from the vehicle side structure.
Figure 4D:
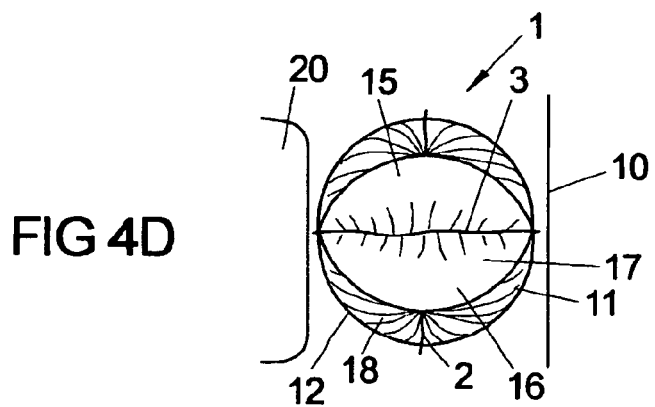
FIG. 4D shows a view of the airbag according to FIG. 4A from above.

FIGS. 4A to 4D show various views of an airbag 1 according to the invention, which is based on the principle of FIG. 3. In detail, FIG. 4A shows a sectional view through the upper portion 14 of the inflated side airbag 1 which extends between the vehicle occupant 20 and the vehicle side structure 10. FIG. 4B shows a view of the airbag 1 from the front of the vehicle, FIG. 4C shows a side view as seen from the vehicle side structure 10, and FIG. 4D shows a view of the airbag from above.

The airbag 1 likewise has a lower portion 13, wherein the airbag layers 11, 12 of the lower portion 13 are connected with each other along the first peripheral seam 2, and airbag layers 15 and 16 of the upper portion 14 are connected with each other along the second peripheral seam 3. In the mounted airbag, the upper portion 14 points to the vehicle headliner and in particular extends along a backrest of a vehicle seat on which the vehicle occupant to be protected is seated.

The first peripheral seam 2 is oriented along a plane which is formed by the longitudinal and the height direction of the vehicle, while the second peripheral seam 3 extends along a plane which extends transversely to the plane formed by the longitudinal and the height direction of the vehicle. In particular, the second peripheral seam 3 extends along a plane which is oriented approximately parallel to the backrest of the vehicle seat.

As shown in FIG. 4A, an inflatable upper chamber 17 is defined by the airbag layers 15 and 16 of the upper portion 14, which are connected with each other by means of the peripheral seam 3. In the region of the upper chamber 17 a gas generator 4 is located, which is connected with a vehicle structure (in particular a backrest of a vehicle seat) by means of fastening bolts (not shown) which extend through openings in the airbag layer 15.

Furthermore, in the region of the upper chamber 17 of the airbag an outflow opening 5 is provided, through which gas can flow off from the upper chamber into the environment. The outflow opening 5 is located in the airbag layer 16 facing the vehicle front and thus at a distance to the peripheral seam 3.

The upper portion 14 of the airbag, i.e. the upper chamber 17, is separated from the lower region 13 of the airbag by a separating seam 5, so that by the airbag layers 11 and 12, which are connected with each other by the first peripheral seam 2, a further, lower chamber 18 is defined. Due to the different orientations of the first and the second peripheral seam 2, 3, the upper chamber 17 is rotated relative to the lower chamber 18.

In the inflated condition of the airbag 1, due to the contour of the peripheral seam 3 along a plane transverse to the longitudinal direction of the vehicle, i.e. in direction of action of the airbag, the upper chamber 17 also has a greater thickness than the lower chamber 18, whose peripheral seam 2 extends along a plane which is formed by the longitudinal and the height direction of the vehicle. Due to the contour of the seam 2, the lower chamber 18 has its greatest expansion along the longitudinal direction of the vehicle.

It should be noted that the seam 5, which separates the upper portion 14 of the airbag from the lower portion 13, is optional. It is also conceivable that the upper and the lower portion of the airbag form a common chamber. At least it is conceivable that the upper chamber 17 is in flow connection with the lower chamber 18 by overflow means, e.g. in the form of an interruption of the seam 5.

Figure 5:
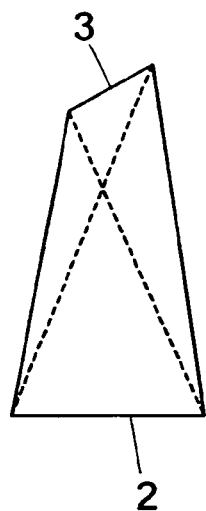
FIG. 5 shows a schematic diagram of a fourth exemplary embodiment of the airbag according to the invention.

The principle that the upper portion of the airbag is rotated relative to the lower portion of the airbag is indicated in FIG. 5, which only shows the two seams 2, 3 rotated against each other.

Figure 6A:
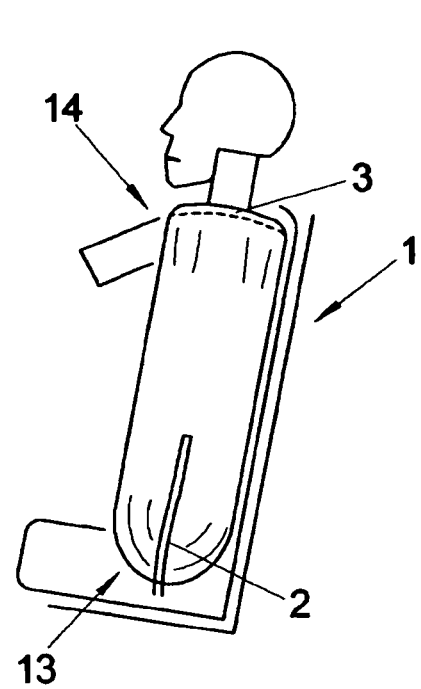
FIG. 6A shows a side view of an airbag according to a fourth exemplary embodiment of the invention.
Figure 6B:
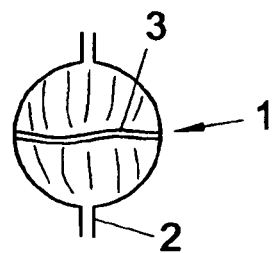
FIG. 6B shows a top view of an airbag according to FIG. 6A.

FIGS. 6A and 6B show a side view and a top view, respectively, of such an airbag, whose lower portion 13 includes the first peripheral seam 2, which extends along a plane transverse to the plane which is formed by the longitudinal and the height direction of the vehicle, and whose upper portion 14 includes the second peripheral seam 3, which extends along the plane formed by the longitudinal direction and the height direction of the vehicle. The upper and the lower portion 13, 14 of the airbag in particular form a common chamber.

Figure 7:
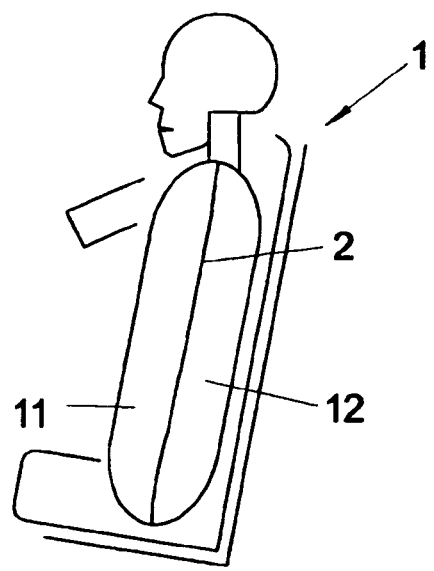
FIG. 7 shows a side view of an airbag according to a fifth exemplary embodiment of the invention.

FIG. 7 relates to a further exemplary embodiment of an airbag 1 according to the invention. The airbag 1 includes two airbag layers 11, 12 which are connected with each other along a single, circumferential peripheral seam 2, so that a single chamber of the airbag is defined by the two airbag layers 11, 12 and the peripheral seam 2.

It is of course also conceivable that the airbag layers 11, 12 and the circumferential peripheral seam 2 define a plurality of chambers of the airbag, e.g. due to the fact that between the layers 11, 12 separating means are provided, for example in the form of a strap or a dart, so that between the layers 11, 12 a plurality of inflatable chambers are formed. In the inflated condition of the airbag 1, according to the example of FIG. 7, the circumferential seam 2 extends along a plane which is oriented transversely to a plane formed by the longitudinal and the height direction of the vehicle and parallel to the backrest of the vehicle seat on which the vehicle occupant to be protected is seated.

Figure 8A:
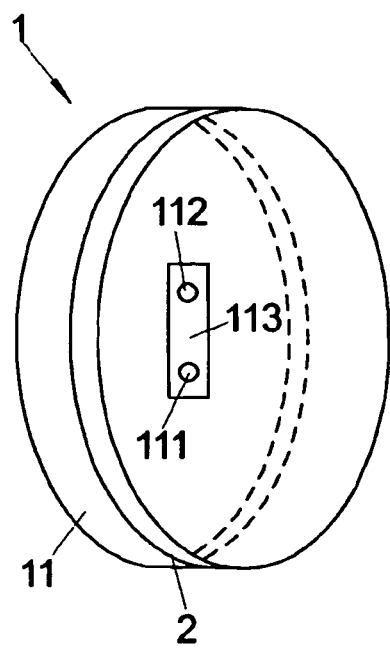
FIG. 8A shows an airbag according to a sixth exemplary embodiment of the invention.
Figure 8B:
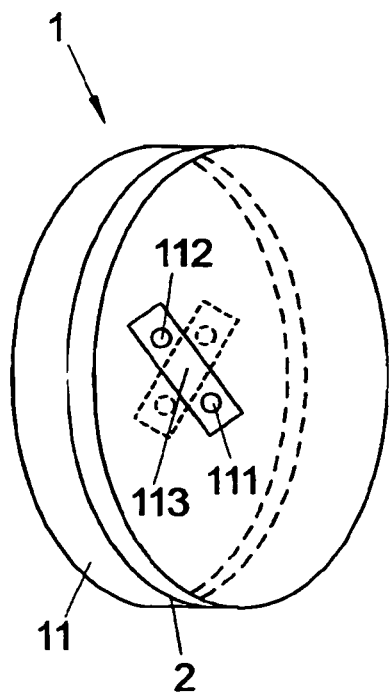
FIG. 8B shows an airbag according to FIG. 8A.

FIGS. 8A and 8B relate to a modification of the exemplary embodiment of FIG. 7, wherein a section through the airbag is shown. The airbag 1 includes fastening means in the form of two openings 111, 112 in the first airbag layer 11, which serve for connecting the airbag 1 with a gas generator (not shown). In the region of the openings 111, 112 a reinforcing layer 113, e.g. made of an airbag material, is connected with the first layer 11.

As shown in FIG. 8A, the openings 111, 112—based on the mounted condition of the airbag—are arranged one above the other in height direction of the vehicle. In the example of FIG. 8B, the openings 111, 112 and the reinforcing layer 113 are rotated, however, i.e. arranged along an axis which extends obliquely to the height direction of the vehicle.

It should be noted that elements of the various exemplary embodiments described above can of course also be used in combination with each other, e.g. the arrangement shown in FIGS. 8A and 8B can be used for fixing a gas generator also with elements of the remaining exemplary embodiments.

The priority application, German Patent Application Number 10 2009 019 766.4, filed on Apr. 28, 2009 is incorporated by reference herein.

The invention claimed is:

1. An airbag for a vehicle occupant restraint system of a motor vehicle, comprising:
   at least one first and one second layer of an airbag material;
   at least one inflatable chamber formed between the first and the second layer, which is inflatable for the protection of a vehicle occupant;
   a first seam, by which the first and the second layer are connected with each other along at least a portion of their respective circumference; and
   a second seam, by which two layers of the airbag are connected with each other along their respective circumference, wherein the first and second layer are directly connected to one another via the first seam and via the second seam, wherein the airbag is deployed between a vehicle occupant and a vehicle side structure, and wherein the airbag is a seat airbag or a door airbag formed such that when the airbag is mounted in the vehicle and inflated, the first seam extends along a first plane which is oriented obliquely or transversely to a plane formed by the longitudinal and the height direction of the vehicle, and the second seam extends along a second plane, wherein the second plane extends obliquely or transversely to the first plane, and the first and second seams do not extend in a common plane, wherein the first seam extends in an upper region of the airbag and the second seam extends in a lower region of the airbag or the first seam extends in a lower region of the airbag and the second seam extends in an upper region of the airbag, and the first seam is the only peripheral seam of the region in which it extends.

2. The airbag according to claim 1, wherein when the airbag is mounted and inflated, the height direction of the vehicle extends at least approximately parallel to the plane along which the first seam extends.

3. The airbag according to claim 1, wherein the two layers connected by the second seam are the first and the second layer, so that the first and the second layer are connected with each other by the first seam along a first portion and by the second seam along a second portion of their respective circumference.

4. The airbag according to claim 1, wherein the two layers connected by the second seam are further airbag layers different from the first and the second layer.

5. The airbag according to claim 4, wherein the first and the second layer define a first inflatable chamber and the two layers which are connected with each other by the second seam define a second chamber of the airbag.

6. The airbag according to claim 4, wherein the first and the second layer and the two layers which are connected with each other by the second seam jointly define an individual chamber of the airbag.

7. The airbag according to claim 1, wherein the first plane extends transversely and the second plane parallel to the plane formed by the longitudinal and the height direction of the vehicle.

8. The airbag according to claim 1, wherein the first and the second layer define a plurality of inflatable chambers.

9. The airbag according to claim 1, wherein the first and the second layer are formed of an integral, folded piece of material.

10. The airbag according to claim 1, further comprising fastening means for connecting the airbag with a gas generator for inflating the airbag, wherein the fastening means are arranged at a distance to the first seam.

11. The airbag according to claim 10, wherein the fastening means comprise at least one opening in the first or the second layer.

12. The airbag according to claim 1, further comprising an outflow opening arranged at a distance to the first seam, through which gas can flow off from the airbag into the environment.

13. An airbag for a vehicle occupant restraint system of a motor vehicle comprising:

at least one first and one second layer of an airbag material;

at least one inflatable chamber formed between the first and the second layer, which is inflatable for the protection of a vehicle occupant;

a first seam, by which the first and the second layer are connected with each other along at least a portion of their respective circumference; and a second seam, by which two layers of the airbag are connected with each other along their respective circumference, wherein the first and second layer are directly connected to one another via the first seam and via the second seam, wherein the airbag is a seat airbag or a door airbag and extends in the inflated condition along a main plane of extension, wherein the first seam extends along a first plane which is oriented obliquely or transversely to the main plane of extension, wherein the second seam extends along a second plane, wherein the second plane extends obliquely or transversely to the first plane, and wherein the first and the second seams do not extend in a common plane, wherein the first seam extends in an upper region of the airbag and the second seam extends in a lower region of the airbag or the first seam extends in a lower region of the airbag and the second seam extends in an upper region of the airbag, and the first seam is the only peripheral seam of the region in which it extends.

14. The airbag according to claim 13, wherein when the airbag is mounted in the vehicle and inflated, the main plane of extension is oriented approximately parallel to a plane formed by the longitudinal and the height direction of the vehicle.

15. A method for producing an airbag, namely a seat airbag or a door airbag, according to which a first and a second layer of an airbag material are connected with each other via a first seam along at least a portion of their respective circumference, and two layers of the airbag are connected with each other via a second seam along their respective circumference, wherein the first and second layer are directly connected to one another via the first seam and via the second seam, the first and the second layer are formed such that when the airbag is arranged in a vehicle such that the airbag is deployed between a vehicle occupant and a vehicle side structure, the first seam extends along a first plane which is oriented obliquely or transversely to a plane formed by the longitudinal and the height direction of the vehicle, and the second seam extends along a second plane, wherein the second plane extends obliquely or transversely to the first plane, and the first and the second seams do not extend in a common plane, wherein the first seam extends in an upper region of the airbag and the second seam extends in a lower region of the airbag or the first seam extends in a lower region of the airbag and the second seam extends in an upper region of the airbag, and the first seam is the only peripheral seam of the region of the airbag in which it extends.

16. An airbag for a vehicle occupant restraint system of a motor vehicle, comprising:

at least one first and one second layer of an airbag material;

at least one inflatable chamber formed between the first and the second layer, which is inflatable for the protection of a vehicle occupant; and at least one seam, by which the first and the second layer are connected with each other along at least a portion of their respective circumference, wherein the airbag is deployed between a vehicle occupant and a vehicle side structure, and wherein the airbag is a seat airbag or a door airbag formed such that when the airbag is mounted in the vehicle and inflated, the entire at least one seam extends along a plane which is oriented obliquely or transversely to a plane formed by the longitudinal and the height direction of the vehicle, and the at least one seam is the only seam via which the first and the second layer are connected to one another.

17. An airbag for a vehicle occupant restraint system of a motor vehicle, comprising:
at least one first and one second layer of an airbag material;
at least one inflatable chamber formed between the first and the second layer, which is inflatable for the protection of a vehicle occupant; and
at least one seam, by which the first and the second layer are connected with each other along at least a portion of their respective circumference,
wherein the airbag is deployed between a vehicle occupant and a vehicle side structure, and
wherein the airbag is a seat airbag or a door airbag formed such that when the airbag is mounted in the vehicle and inflated, the entire at least one seam extends along a plane which is oriented obliquely or transversely to a plane formed by the longitudinal and the height direction of the vehicle, and the at least one seam extends along the entire circumference of the first and the second layer.

18. An airbag for a vehicle occupant restraint system of a motor vehicle, comprising:
at least one first and one second layer of an airbag material;
at least one inflatable chamber formed between the first and the second layer, which is inflatable for the protection of a vehicle occupant; and
at least one seam, by which the first and the second layer are connected with each other along a portion of their respective circumference, wherein
the airbag is deployed between a vehicle occupant and a vehicle side structure, and wherein
the airbag is a seat airbag or a door airbag formed such that when the airbag is mounted in the vehicle and inflated, the entire at least one seam extends along a plane which is oriented obliquely or transversely to a plane formed by the longitudinal and height direction of the vehicle,
wherein the inflatable chamber is exclusively delimited by the first and second layer and wherein the at least one seam extends in at least a partially curved manner, and
wherein the airbag does not include peripheral seams other than the at least one seam.

19. An airbag for a vehicle occupant restraint system of a motor vehicle, comprising:
at least one first and one second layer of an airbag material;
at least one inflatable chamber formed between the first and the second layer, which is inflatable for the protection of a vehicle occupant; and
at least one seam, by which the first and the second layer are connected with each other along at least a portion of their respective circumference,
wherein the airbag is deployed between a vehicle occupant and a vehicle side structure, and
wherein the airbag is a seat airbag or a door airbag formed such that when the airbag is mounted in the vehicle and inflated, the entire at least one seam extends along a plane which is oriented obliquely or transversely to a plane formed by the longitudinal and height direction of the vehicle,
wherein the inflatable chamber is exclusively delimited by the first and second layer and wherein the at least one seam extends in at least a partially curved manner,
and an outflow opening located in a side of the airbag that faces towards a front of the vehicle.

20. An airbag arrangement comprising the airbag of claim 19, and further comprising:
a gas generator for generating gas for inflating the airbag;
wherein the gas generator and the outflow opening are arranged in the plane that is spanned by the vehicle longitudinal and the vehicle height direction.

21. An airbag for a vehicle occupant restraint system of a motor vehicle, comprising:
at least one first and one second layer of an airbag material;
at least one inflatable chamber formed between the first and the second layer, which is inflatable for the protection of a vehicle occupant; and
at least one seam or a plurality of seams, by which the first and the second layer are connected with each other along a portion of their respective circumference,
wherein the airbag is deployed between a vehicle occupant and a vehicle side structure, and
wherein the airbag is a seat airbag or a door airbag formed such that when the airbag is mounted in the vehicle and inflated, the entire seam or the entire of each one of the plurality of seams extends along a plane which is oriented obliquely or transversely to a plane formed by the longitudinal and height direction of the vehicle,
wherein the inflatable chamber is exclusively delimited by the first and second layer and wherein the seam or the plurality of seams extends in at least a partially curved manner, and
wherein the seam is the only peripheral seam of the airbag or the plurality of seams are the only peripheral seams of the airbag.

* * * * *